(12) United States Patent
Evenor et al.

(10) Patent No.: US 10,965,190 B2
(45) Date of Patent: Mar. 30, 2021

(54) ELECTRIC MOTOR

(71) Applicant: SAFRAN LANDING SYSTEMS, Velizy-Villacoublay (FR)

(72) Inventors: Eric Evenor, Velizy-Villacoublay (FR); Francois-Noel Leynaert, Velizy-Villacoublay (FR); Raphael Pierra, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 626 days.

(21) Appl. No.: 15/284,772

(22) Filed: Oct. 4, 2016

(65) Prior Publication Data

US 2017/0098976 A1    Apr. 6, 2017

(30) Foreign Application Priority Data

Oct. 5, 2015   (FR) ..................... 15 59460

(51) Int. Cl.
| | |
|---|---|
| H02K 11/21 | (2016.01) |
| H02K 7/14 | (2006.01) |
| H02K 3/18 | (2006.01) |
| H02K 1/14 | (2006.01) |
| H02K 11/215 | (2016.01) |
| H02K 1/16 | (2006.01) |

(52) U.S. Cl.
CPC ............... *H02K 7/14* (2013.01); *H02K 1/148* (2013.01); *H02K 1/16* (2013.01); *H02K 3/18* (2013.01); *H02K 11/21* (2016.01); *H02K 11/215* (2016.01); *H02K 2211/03* (2013.01); *H02K 2213/06* (2013.01)

(58) Field of Classification Search
CPC .......... H02K 1/16; H02K 1/148; H02K 11/21; H02K 11/215; H02K 2211/03; H02K 11/20–11/38
See application file for complete search history.

(56) References Cited

U.S. PATENT DOCUMENTS

| | | | | |
|---|---|---|---|---|
| 6,081,056 | A | * | 6/2000 | Takagi ................ H02K 5/08 310/216.137 |
| 2006/0033400 | A1 | | 2/2006 | Totsu et al. |
| 2006/0238059 | A1 | * | 10/2006 | Komatsu ............... H02K 1/14 310/162 |
| 2014/0269837 | A1 | | 9/2014 | Durland et al. |
| 2014/0327331 | A1 | * | 11/2014 | Hikita .................. H02K 3/28 310/71 |

FOREIGN PATENT DOCUMENTS

| | | |
|---|---|---|
| WO | 2005/112226 A1 | 11/2005 |
| WO | 2014/170414 A2 | 10/2014 |

OTHER PUBLICATIONS

French Search Report for FR 1559460 dated Jun. 7, 2016.

* cited by examiner

*Primary Examiner* — Ramon M Barrera
(74) *Attorney, Agent, or Firm* — Sughrue Mion, PLLC

(57) ABSTRACT

Electric motor comprising a rotor and a stator (2), the stator comprising a body (3) forming a frame and a windings assembly (4, 5) housed in slots of the body. The electric motor comprises at least one rod (16, 23) used to connect, to one another, at least two fixed assembled parts of the electric motor, the rod extending into a housing (9) formed in the body over the entire length thereof in order to emerge on each side of the body.

11 Claims, 2 Drawing Sheets

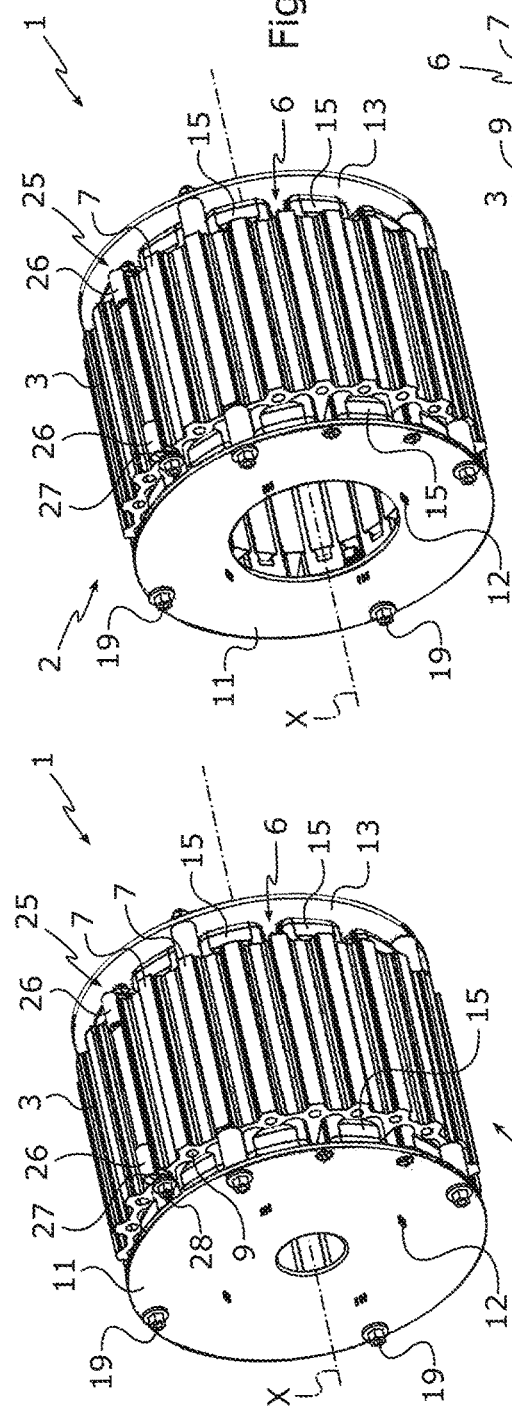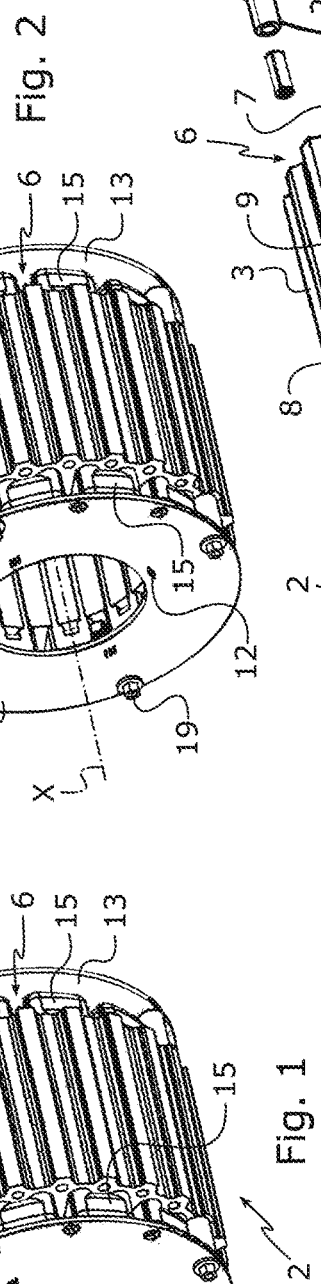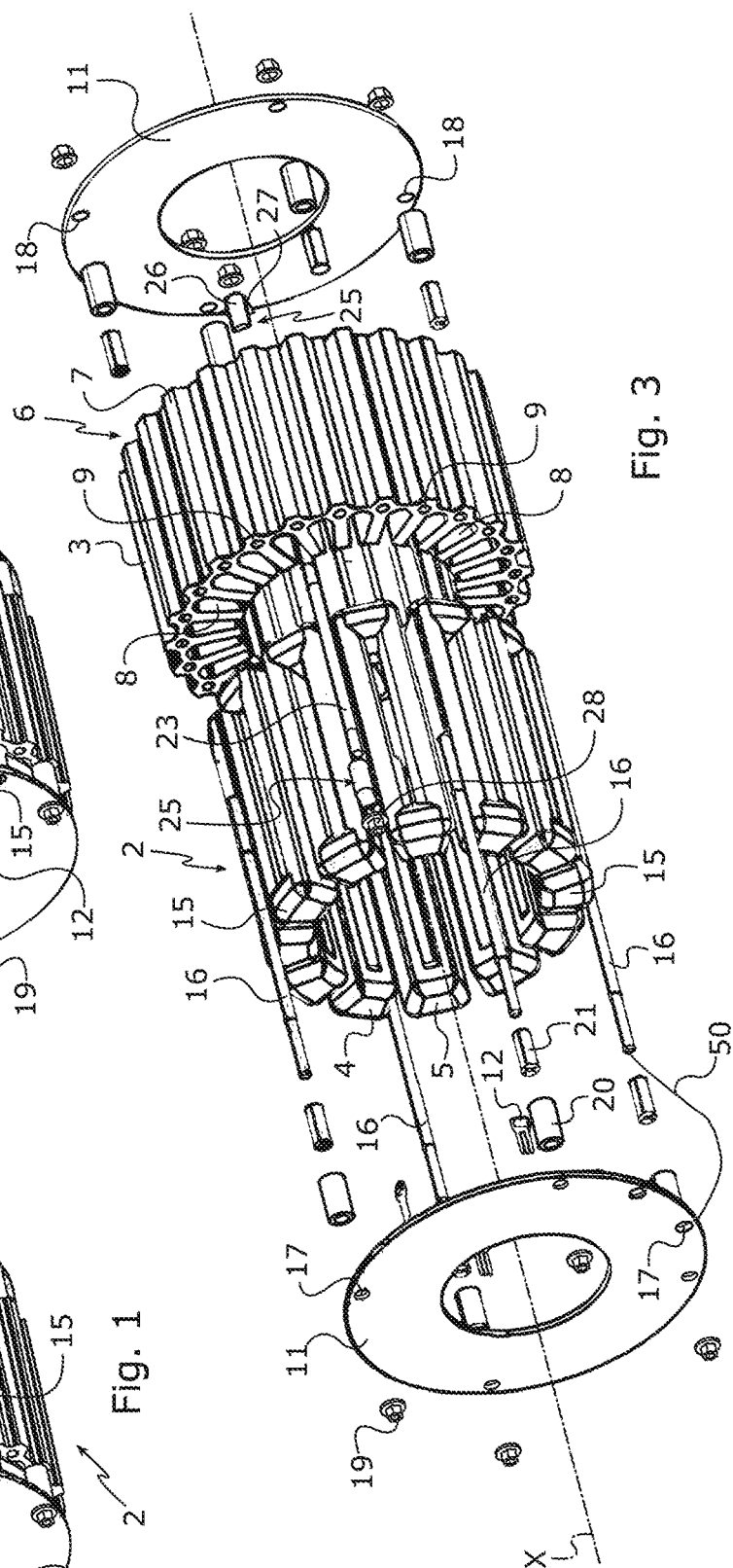

ELECTRIC MOTOR

The invention relates to the field of electric motors such as those fitted to electromechanical actuators used in aircraft or other vehicles.

BACKGROUND OF THE INVENTION

Numerous electromechanical actuators are found in modern-day aircraft and used for various applications: flight controls, wheel braking, rotational driving of wheels, etc.

Electromechanical actuators comprise an actuating member and an electric motor designed to drive the actuating member.

The design of an electric motor for an electromechanical actuator needs to meet specifications at "equipment" level and at "system" level. These specifications, which are dependent on the application in which the electric motor is used, translate into numerous and restrictive requirements that have an impact on the manufacture of the electric motor.

These requirements in particular include integration requirements (for example requirements relating to the volume of the electric motor or to the integration of power supply or monitoring electrical components into the electric motor), architecture requirements (for example a requirement of inbuilt redundancy which leads to the electric motor being fitted with two separate coils), requirements in terms of mechanical robustness (for example a requirement of resistance to impact, vibrations), etc.

The electric motor needs to meet all of these requirements, making it relatively complex to manufacture.

OBJECT OF THE INVENTION

The objective of the invention is an electric motor that can be equipped with electrical components and that is robust, compact and relatively simple to manufacture.

SUMMARY OF THE INVENTION

With a view to achieving this objective, there is proposed an electric motor comprising a rotor and a stator, the stator comprising a body forming a frame and a windings assembly housed in slots of the body. According to the invention, the electric motor comprises at least one rod used to connect, to one another, at least two fixed assembled parts of the electric motor, the rod extending into a housing formed in the body over the entire length thereof in order to emerge on each side of the body.

The use of the rod positioned in the housing formed along the entire length of the body allows simple and robust assembly of the electric motor. This assembly is particularly well suited to attaching to the body an electric board positioned on one face of the body of the stator of the electric motor.

Further features and advantages of the invention will become apparent from reading the following description of one nonlimiting particular embodiment of the invention.

BRIEF DESCRIPTION OF THE DRAWINGS

Reference will be made to the attached drawings, among which:

FIG. 1 is a perspective view of an electric motor according to a first embodiment of the invention;

FIG. 2 is a view similar to that of FIG. 1, in which a central part of an electric board of the electric motor is not depicted in order to make the inside of a stator of the electric motor visible;

FIG. 3 is an exploded view of the electric motor of the invention according to the first embodiment;

DETAILED DESCRIPTION OF THE INVENTION

Figure 4:
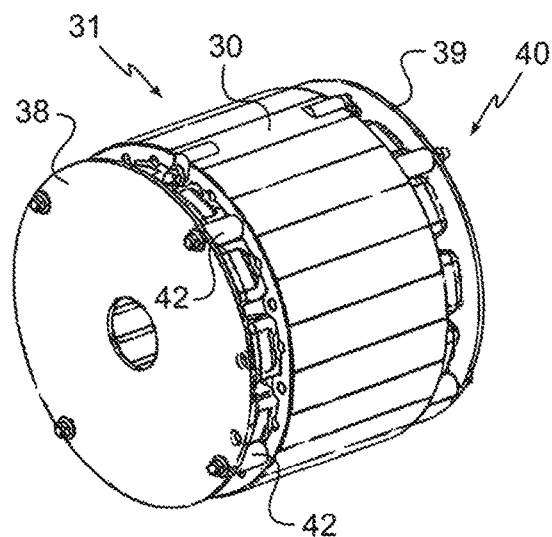
FIG. 4 is a perspective view of an electric motor according to a second embodiment of the invention.

With reference to FIGS. 1 to 3, the electric motor 1 according to the first embodiment of the invention comprises a casing of cylindrical overall external appearance (which has not been depicted), inside which a fixed stator 2 and a rotor (not depicted) rotationally driven about an axis X are incorporated.

The stator 2 comprises a body 3, a first coil assembly 4 and a second coil assembly 5 which is distinct from and magnetically not coupled to the first coil assembly 4.

The body 3 of the stator 2 has a tubular overall shape with an internal surface that is substantially cylindrical in order to accommodate the rotor and an external surface that is substantially cylindrical. The body 3 is made up of a plurality of laminations forming a frame and stacked in an axial direction (in this case along the axis X).

The body 3 of the stator 2 is made in one piece in this embodiment and comprises a plurality of radial sectors 6 which are evenly distributed about the circumference of the body 3 of the stator 2 and which extend over the entire length of the body 3 of the stator 2.

Each radial sector 6 comprises an internal radial rib the terminal surface of which forms a longitudinal portion of the internal surface of the body 3 and an external radial rib 7 the terminal surface of which forms the external surface of the body 3.

The internal radial ribs of the radial sectors 6 between them delimit slots 8 which are open at their ends and towards the inside of the body 3.

Housings 9 are formed in the body 3 at the periphery of the body 3 and over its entire length parallel to the central axis of the body 3 to open at each end of the body 3. Each housing 9 is positioned at the level of a radial sector 6 and is formed between the internal surface of the body 3 and the external surface of the body 3 partially inside the rib 7 of the relevant radial sector 6.

The first coil assembly 4 and the second coil assembly 5 are housed in the slots 8 of the body 3 of the stator 2.

The electric motor 1 additionally comprises a first electric board 11 comprising first electrical components 12 and a second electric board 13 comprising second electrical components.

The first electrical components 12, like the second electrical components 13, comprise Hall-effect sensors intended to measure the position of the rotor in order to control the electric motor 1.

This then yields an architecture with inbuilt redundancy ("full duplex" architecture): the electric motor 1 can be driven and therefore can operate despite a fault affecting the first electric board 11 or affecting the second electric board 13, or affecting the first coil assembly 4 or affecting the second coil assembly 5.

The first electric board 11 and the second electric board 13 are electric boards of annular shape the outside diameter of which is substantially equal to the outside diameter of the body 3 of the stator 2 (including the height of the ribs 7). The first electric board 11 and the second electric board 13 are each positioned on a different face of the body 3, being mounted parallel to the said face and placed against winding overhangs 15 of the first coil assembly 4 and of the second coil assembly 5.

The body 3 of the stator 2, the first electric board 11 and the second electric board 13 are assembled using rods 16 (in this instance four rods) which extend through four housings 9 uniformly spaced about the circumference of the body 3 of the stator 2.

The length of each rod 16 is greater than that of the body 3 of the stator 2. Thus, a first end of each rod 16 emerges from the housing 9 in which it is positioned and extends from the relevant face of the body 3 of the stator 2 as far as the first electric board 11, running alongside the winding overhangs 15, then extends through a fixing hole 17 formed in the first electric board 11. Likewise, a second end of each rod 16 emerges from the housing 9 in which it is positioned and extends from the relevant face of the body 3 of the stator 2 as far as the second electric board 13, running alongside the winding overhangs 15, then extends through a fixing hole 18 formed in the second electric board 13.

The first electric board 11 and the second electric board 13 are fixed to each rod 16 using a nut 19.

A spacer piece 20 and a bushing 21 extend around the first end of each rod 16 between the relevant face of the body 3 of the stator 2 and the first electric board 11.

Likewise, a spacer piece 20 and a bushing 21 extend around the second end of each rod 16 between the relevant face of the body 3 of the stator 2 and the second electric board 13.

It will be noted that the rods 16 are hollow and that electric leads 50 are routed along inside the rods 16 to power the first electric board 11 and the second electric board 13.

This then achieves a simple and robust assembly of the body 3 of the stator 2, of the first electric board 11 and of the second electric board 13.

It will be noted that a fifth rod 23, shorter than the rods 16, extends through a fifth housing 9. This fifth rod 23 has two ends each of which emerges onto a different face of the body 3 of the stator 2. The fifth rod 23 is used to attach to the body 3 two rotation-proofing lugs 25 which are intended to secure the body 3 of the stator 2 and the casing of the electric motor 1 in terms of rotation. Each lug 25 comprises a main section 26 of semicircular cross section, having a flat surface arranged on part of the length of a rib 7 of a radial sector 6, and a base 27 pierced with a fixing hole. The main section 26 performs the rotation-proofing function. The fixing hole in the base 27 allows the lug 25 to be fixed to the body 3 of the stator 2 using the fifth rod 23 which extends through the fixing hole, and using a nut 28.

Figure 5:
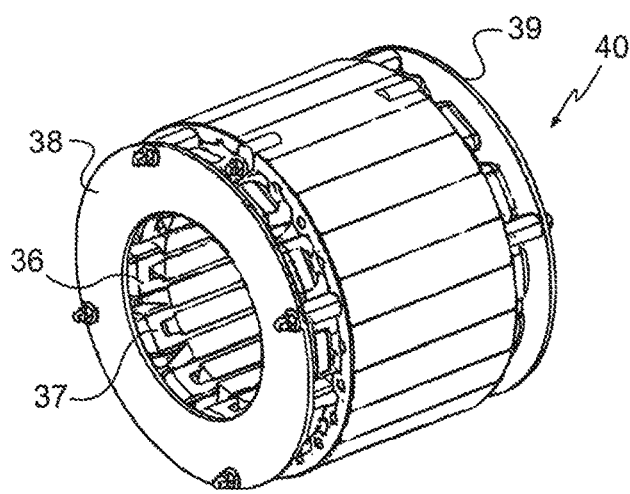
FIG. 5 is a view similar to that of FIG. 4, in which a central part of an electric board of the electric motor is not depicted in order to make the inside of a stator of the electric motor visible.
Figure 6:
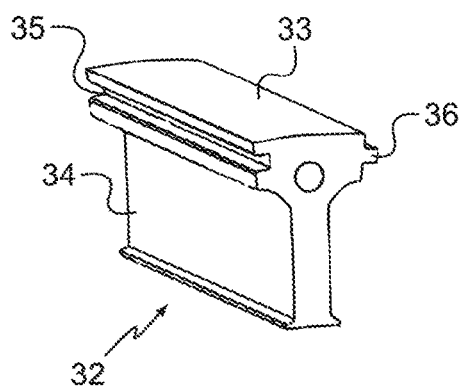
FIG. 6 depicts a portion of a radial segment used to manufacture a body of the stator of the electric motor according to the second embodiment of the invention.
Figure 7:
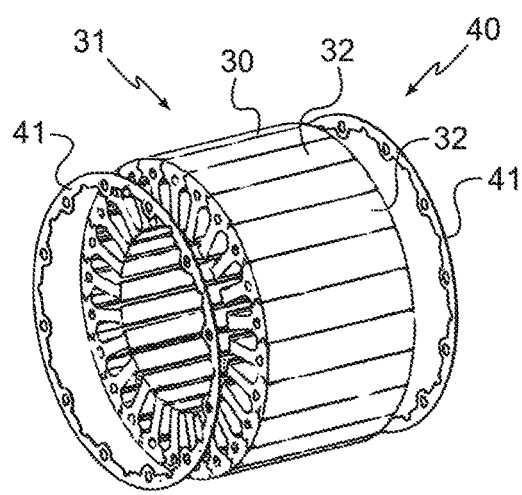
FIG. 7 depicts the body of the stator of the electric motor according to the second embodiment of the invention prior to assembly thereof.

With reference to FIGS. 4 to 7, the electric motor according to a second embodiment of the invention 40 comprises a stator 31 comprising a hollow body 30 of cylindrical external shape.

The body 30 is made up of a plurality of laminations forming a frame and stacked in an axial direction (in this instance along the axis X).

In the second embodiment of the invention, the body 30 of the stator 31 of the electric motor 40 is made up of the assembly of distinct radial segments 32 extending over the entire length of the body 30. Each radial segment 32 comprises a base 33 defining a circular sector and a main section 34. A groove 35 and a rib 36 are formed on the base 33 of each radial segment 32. The radial segments 32 are assembled by means of the groove 35 and of the rib 36 of the base 33 of each radial segment 32 to form the body 30 of the stator 31.

When the radial segments 32 are assembled, the circular sectors of the bases 33 define the cylindrical exterior shape of the body 30 of the stator 31 and the main sections 34 extend radially towards the inside of the body 30 of the stator 31 and form slots in which a first coil assembly 43 and a second coil assembly 37 are housed.

The electric motor 40 additionally comprises a first electric board 38 and a second electric board 39 performing the same function as in the first embodiment of the invention. Assembly of the motor 40 is similar to that of the first embodiment except that the electric motor 40 according to the second embodiment further comprises two flat annular fixing rings 41 each positioned against a different face of the body 30 of the stator 31. The annular fixing rings 41 join together the distinct radial segments 32. The annular fixing rings 41 have, passing through them, the four rods used to assemble the body 30, the first electric board 38 and the second electric board 39 and are fixed axially by means of the spacer pieces 42 which extend between each electric board 38, 39 and the face of the body 30 of the stator 31 on which this board is positioned.

In a third embodiment of the invention, the body of the stator is made up of a plurality of laminations forming a frame and stacked in an axial direction (in this instance, along the axis X).

Each lamination comprises fixing holes. When the laminations are stacked, the fixing holes are positioned facing one another so as to form housings that extend over the entire length of the body. The rods emerge from an upper lamination of the body and from a lower lamination of the body to be fixed to the upper lamination and to the lower lamination using fixing means once again involving nuts. Alternatively, the annular fixing rings of the second embodiment and the spacer pieces may also be used with the rods to assemble the laminations and the electric boards.

It will be noted here that the rods may also act as end stops for the translational movement of the electric motor or as heat bridges to remove the heat generated by the operation of the motor.

The invention is not restricted to the particular embodiments which have just been described but rather covers any alternative form that falls within the scope of the invention as defined by the claims.

Although a motor equipped with two electric boards has been described, the motor could perfectly well comprise a single electric board positioned like one of the first or second electric boards (in an architecture of the simplex type).

Although it has been indicated that the first electric components and the second electric components comprise Hall-effect sensors intended to measure the position of the rotor in order to control the electric motor 1, the electric boards may perfectly well comprise different electric components, for example sensors of a different type or alternatively components intended to generate an electrical current flowing through the coils for powering the electric motor.

The body 3 of the first embodiment may also be in several pieces.

The invention claimed is:

1. An electric motor comprising a rotor and a stator (2; 31), the stator comprising a body (3; 30) forming a frame and a windings assembly (4, 5; 43, 37) housed in slots (8) of the body;
   the electric motor comprising at least one rod (16, 23) to fix, to one another, at least two fixed assembled parts of the electric motor,
   the length of each rod being greater than that of the body of the stator,
   the rod extending into a housing (9) formed in the body over the entire length thereof in order to emerge on each side of the body,
   wherein the rod is distinct from the assembled parts,
   wherein the assembled parts comprise the body and an electric board (11, 13; 38, 39) positioned on a superior or inferior face of the body and comprising electrical components,
   wherein a first end of each at least one rod emerges from the housing in which it is positioned and extends from the relevant face of the body of the stator as far as the electric board, running alongside winding overhangs, the electric board being fixed to each at least one rod, and
   wherein the electric components comprise sensors intended to measure a position of the rotor.

2. The electric motor according to claim 1 comprising two separate coil assemblies housed in the slots of the body, the assembled parts comprising the body and two electric boards each one positioned on a different face of the body.

3. The electric motor according to claim 1, in which an electric lead electrically connected to the electric board is routed along inside the rod.

4. The electric motor according to claim 1, in which the assembled parts comprise distinct radial segments (32) constituting the body and defining the slots.

5. The electric motor according to claim 4, in which two annular rings (41) each one positioned against a different face of the body and through which the rod extends are also used to join the radial segments together.

6. The electric motor according to claim 1, in which the assembled parts comprise laminations stacked in an axial direction (X) to form the body.

7. The electric motor according to claim 1, in which the assembled parts comprise the body and a casing of the electric motor, and in which the rod allows the attachment to the body of a rotation-proofing lug (25) intended to secure the body and the casing in terms of rotation.

8. The electric motor according to claim 1, in which the housing (9) is situated at the periphery of the body.

9. An electromagnetic actuator comprising an actuating member and an electric motor according to claim 1, used to drive the actuating member.

10. An electric motor comprising a rotor and a stator (2; 31), the stator comprising a body (3; 30) forming a frame and a windings assembly (4, 5; 43, 37) housed in slots (8) of the body;
    the electric motor comprising at least one rod (16, 23) to fix, to one another, at least two fixed assembled parts of the electric motor,
    the rod extending into a housing (9) formed in the body over the entire length thereof in order to emerge on each side of the body,
    wherein the rod is distinct from the assembled parts,
    wherein the assembled parts comprise the body and an electric board (11, 13; 38, 39) positioned on a superior or inferior face of the body and comprising electrical components, and
    wherein the electric components comprise sensors intended to measure a position of the rotor.

11. The electric motor as claimed in claim 10, wherein the housing (9) is situated at the periphery of the body.

* * * * *